US008832066B2

(12) United States Patent
Atherton et al.

(10) Patent No.: US 8,832,066 B2
(45) Date of Patent: *Sep. 9, 2014

(54) INDIRECT DATA SEARCHING ON THE INTERNET

(75) Inventors: David Atherton, Purcellville, VA (US); Robert William Christie, Morrison, CO (US); Tate Massingill, Reston, VA (US)

(73) Assignee: Eye Street Research LLC, Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,081

(22) Filed: May 22, 2012

(65) Prior Publication Data

US 2013/0318064 A1    Nov. 28, 2013

(51) Int. Cl.
*G06F 17/30* (2006.01)

(52) U.S. Cl.
USPC ..... 707/709; 707/754; 707/755; 707/E17.108

(58) Field of Classification Search
CPC ................ G06F 17/30864; G06F 17/30867
USPC .................. 707/709, 710, 754, 755, E17.108
See application file for complete search history.

(56) References Cited

U.S. PATENT DOCUMENTS

| 7,003,506 | B1 * | 2/2006 | Fisk et al. | 707/693 |
|---|---|---|---|---|
| 7,072,890 | B2 | 7/2006 | Salerno et al. | |
| 7,181,681 | B2 | 2/2007 | Kundu | |
| 7,647,351 | B2 | 1/2010 | Monsarrat | |
| 7,647,370 | B1 | 1/2010 | Liu et al. | |
| 8,626,727 | B2 * | 1/2014 | Paknad et al. | 707/694 |
| 2002/0138469 | A1 * | 9/2002 | Horovitz et al. | 707/2 |
| 2004/0044952 | A1 * | 3/2004 | Jiang et al. | 715/500 |
| 2006/0026147 | A1 * | 2/2006 | Cone et al. | 707/3 |
| 2008/0155388 | A1 * | 6/2008 | Conway | 715/205 |
| 2008/0189290 | A1 * | 8/2008 | Kim et al. | 707/10 |
| 2009/0157631 | A1 * | 6/2009 | Coleman et al. | 707/3 |
| 2010/0030753 | A1 * | 2/2010 | Nad et al. | 707/3 |
| 2010/0306229 | A1 * | 12/2010 | Timm et al. | 707/767 |
| 2011/0173218 | A1 * | 7/2011 | Paknad et al. | 707/769 |

\* cited by examiner

*Primary Examiner* — Phong Nguyen
(74) *Attorney, Agent, or Firm* — Da Vinci's Notebook, LLC

(57) ABSTRACT

The present invention includes an Internet analysis process that includes initializing a data set, accessing a search engine to acquire search results, parsing the search results, rather than a native search engine indexable resource, to output a conclusion, and providing an updated data set. The present invention further includes an Internet analysis system that includes a data set initializer to initialize a data set, a search engine to acquire search results, a bot to parse the search results, rather than a native search engine indexable resource, to output a conclusion, and an updated date set.

20 Claims, 10 Drawing Sheets

Down the Rabbit-Hole   ⎫ 114

Alice was beginning to get very tired of sitting by her sister on the bank, and of having nothing to do: once or twice she had peeped into the book her sister was reading, but it had no pictures or conversations in it, `and what is the use of a book,' thought Alice `without pictures or conversation?'

So she was considering in her own mind (as well as she could, for the hot day made her feel very sleepy and stupid), whether the pleasure of making a daisy-chain would be worth the trouble of getting up and picking the daisies, when suddenly a White Rabbit with pink eyes ran close by her.

There was nothing so very remarkable in that; nor did Alice think it so very much out of the way to hear the Rabbit say to itself, `Oh dear! Oh dear! I shall be late!' (when she thought it over afterwards, it occurred to her that she ought to have wondered at this, but at the time it all seemed quite natural); but when the Rabbit actually took a watch out of its waistcoat-pocket, and looked at it, and then hurried on, Alice started to her feet, for it flashed across her mind that she had never before seen a rabbit with either a waistcoat-pocket, or a watch to take out of it, and burning with curiosity, she ran across the field after it, and fortunately was just in time to see it pop down a large rabbit-hole under the hedge.

In another moment down went Alice after it, never once considering how in the world she was to get out again.

The rabbit-hole went straight on like a tunnel for some way, and then dipped suddenly down, so suddenly that Alice had not a moment to think about stopping herself before she found herself falling down a very deep well.

Either the well was very deep, or she fell very slowly, for she had plenty of time as she went down to look about her and to wonder what was going to happen next. First, she tried to look down and make out what she was coming to, but it was too dark to see anything; then she looked at the sides of the well, and noticed that they were filled with cupboards and book-shelves; here and there she saw maps and pictures hung upon pegs. She took down a jar from one of the shelves as she passed; it was labelled `ORANGE MARMALADE', but to her great disappointment it was empty: she did not like to drop the jar for fear of killing somebody, so managed to put it into one of the cupboards as she fell past it.

`Well!' thought Alice to herself, `after such a fall as this, I shall think nothing of tumbling down stairs! How brave they'll all think me at home! Why, I wouldn't say anything about it, even if I fell off the top of the house!' (Which was very likely true.)

Alice - Alice in Wonderland Wiki          116 aliceinwonderland.wikia.com/wiki/Alice
Alice is the primary character from the books Alice's Adventures in Wonderland and its sequel, Through. ... Following the Rabbit down his rabbit-hole, Alice fell a long way past a variety of commonplace objects in what appeared to be a well. ... Tenniel drew Alice in two variants: for Through the Looking-Glass, her pinafore is ...

116

Alicinations: Alice through the lens brasillewiscarroll.blogspot.com/2011/09/alice-through-lens.html
Sep 15, 2011 - "Lewis Carroll's heroine Alice and the Wonderland she visits have ... "Well," thought Alice to herself, "after such a fall as this, I shall think nothing of tumbling down stairs! ... her clothes a frock and pinafore; white stockings and strapped Mary .... the black-and-white means of British television in the mid-1960s.

....

134 though non-limiting in scope, and in no particular order, a name, an address, a phone number, social media data, and the like. Individuals may be property owners, business owners, renters, tenants, or the like. In another embodiment, the investigation may be a business with attributes to include a name, an address, a phone number, social media data, products and services related to the business, customer data, and the like.

INDIRECT DATA SEARCHING ON THE INTERNET

FIELD OF THE INVENTION

The present invention relates to the field of dynamic database searching and more specifically to the field of electronic data analysis.

BACKGROUND

Internet search engines store information from a vast array of web pages retrieved from the Internet, typically implemented through the use of spiders or crawlers. To facilitate the search process, the Internet search engines provide interfaces used to run queries against the indices they build from this information. Generally speaking, Internet search engines build these indices by collecting URLs and following each URL on each page until all URLs for all web pages have been exhausted. During this process, the contents of each web page are analyzed according to various and evolving criteria to determine how particular elements (e.g., titles, headings, files, links, various meta data, and the like), and other related information should be indexed. This index allows information to be found quickly, relevantly, and broadly from a single source.

The automated collection of data available on the Internet is a complicated task. According to U.S. Pat. No. 7,647,351 there is recognized only one primary known means of automatically retrieving information from a web site (without the assistance of the web site owner) utilizing the hidden mark-up language of the web site for correlating useful data. Theoretically, this mark-up can help a computer algorithm locate, process, and interpret information on and about a page. As further noted by the '351 patent, "unfortunately, every Web site has a different look and feel, so each Web page needs its own custom algorithm. Writing a custom algorithm is time-intensive, but possible on a small scale, such as a price comparison website which gathers product information from a dozen sources. But there is no efficient way to scale this approach up to thousands or millions of Web sites, which would require thousands or millions of custom algorithms to be written." The '351 patent attempts to solve data conformity problems by the use of a manually set up template for each web page with a unique look and feel.

In fact, the computer system seeking to process resources (e.g., web pages, news feeds, PDF documents) available on the Internet is faced with an earlier problem: locating those resources in the first place. In some circumstances, the particular Internet locations of the resources to be processed and interpreted are known a priori (i.e., this resource and that resource, located at these URLs) and can be accessed accordingly. In others, no such knowledge exists, except in the abstract (i.e., it is suspected that the information is available somewhere, but it is not known specifically where).

Therefore, there is a need for flexible Internet data search process that can meaningfully analyze and interpret data from disparate Internet resources, without accessing those resources directly, and without foreknowledge of the existence of or locations of such resources.

SUMMARY

The present invention is directed to an Internet analysis system and process for performing analysis and drawing conclusions based on data acquired from the Internet. The system of the present invention includes an initial data set with input data, a non-party search engine, a search initializer, a bot, and an updated data set. The initial data set includes investigation data consisting of a set of entities (e.g., persons) identified by their key attributes (e.g., address) and optionally described by zero or more additional attributes (e.g., business ownership, picture) which can be populated or void. This data is to be tested with respect to a specific investigation activity, occurrence, or other criteria. The populated attributes contain data prior to the analysis and may be updated (or voided) as a result of the analysis; void attributes lack data, i.e., are void, but may become populated later as a result of the analysis.

The nonparty Internet search engine of the present invention includes a search engine that is not affiliated with either the party searching for investigation data on the Internet or websites on the Internet that may contain the investigation data, or indicia thereof. The search initializer is loaded with search keyword data related to the populated attributes and other words and phrases related to the transaction that is the subject of the investigation. The search initializer then accesses the nonparty search engine and executes a search to generate search results, with search result entries and their search result entry data, that is queued and/or paginated by the search engine according to its particular policies. The bot, having been manually loaded with evaluation criteria, parses the search result entry data to acquire data for its analysis and potential subsequent update of one or more attributes, entities, or other data species of the initial data set. The initial data set is thus transformed into the updated data set which may include data related to the initial data set as well as the initial data as supplemented, modified, or culled, by the bot.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

BRIEF DESCRIPTION OF THE DRAWINGS

FIG. 7 is a view of a web page of the present invention.
FIG. 8 is a view of a search result of the present invention.

DETAILED DESCRIPTION

Figure 1:
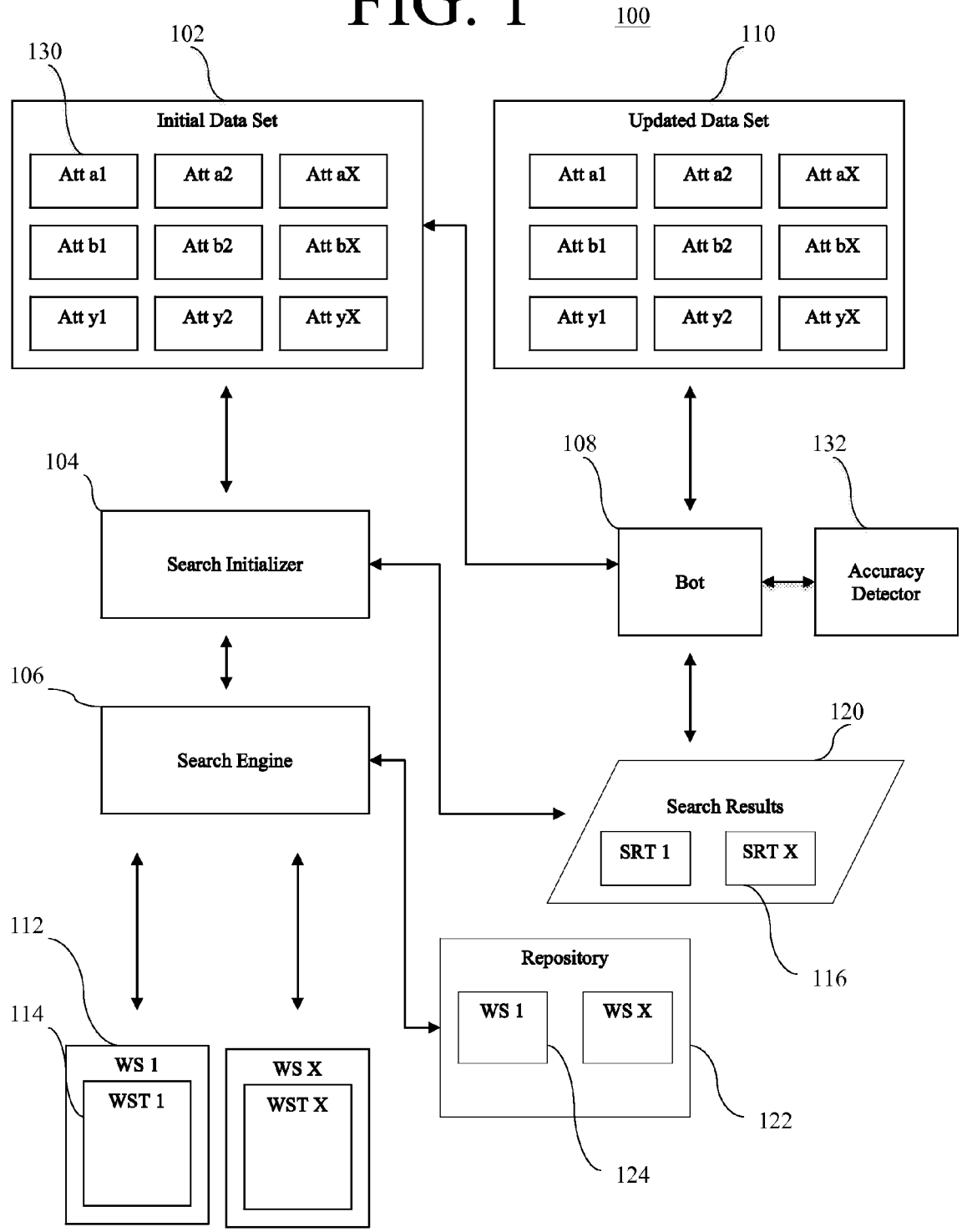
FIG. 1 is a view of the system of the present invention.
Figure 5:
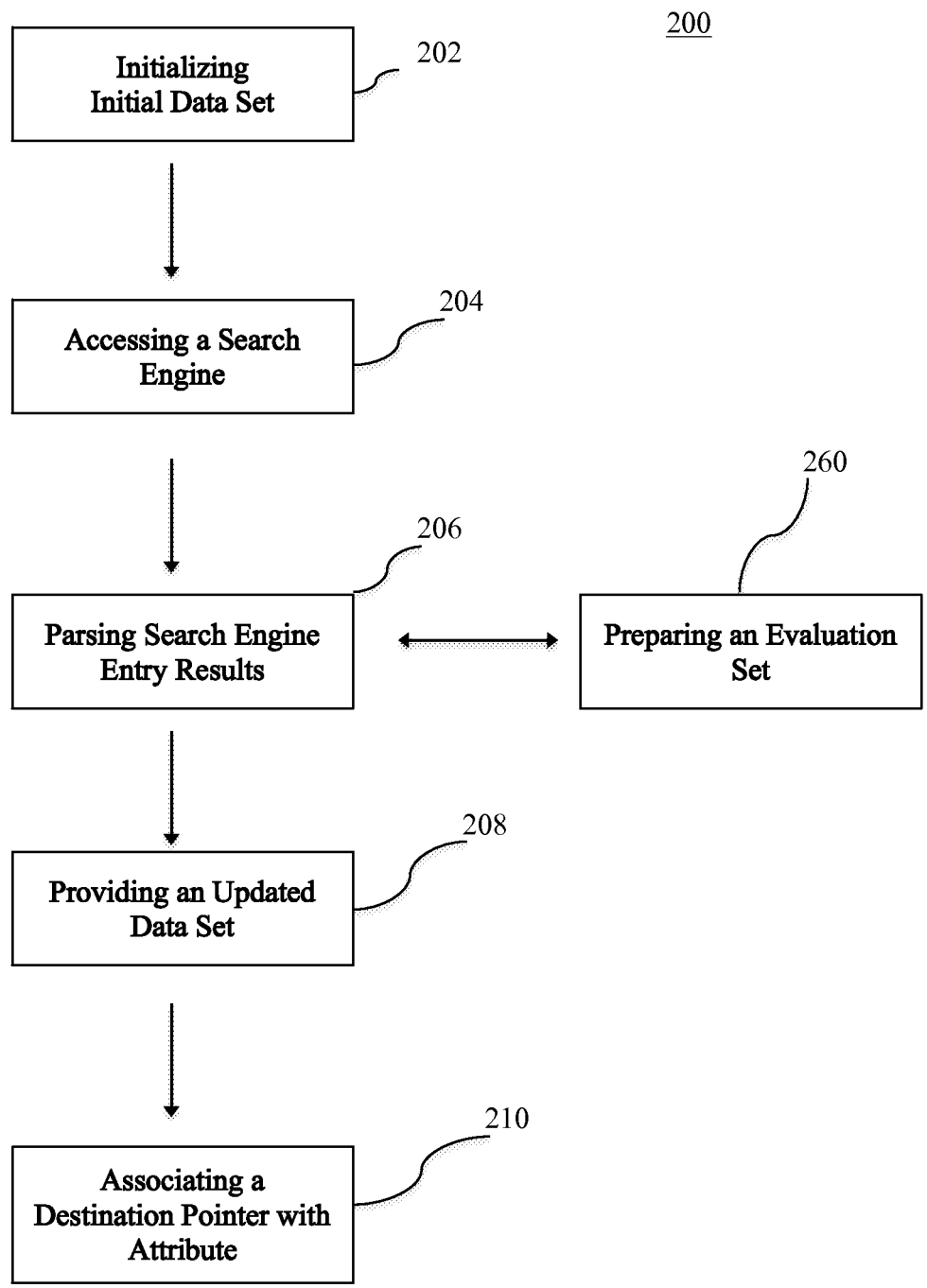
FIG. 5 is a view of the process of the present invention.

Referring first to FIGS. 1 and 5, the present invention includes an Internet analysis system 100 and Internet analysis process 200. The invention operates to utilize a data set to perform an investigation, and preferably, alter a data set based on an analysis of Internet data. The data may comprise any data type and the present invention is not restricted to any particular purpose or datum unless otherwise, expressly noted. In the preferred invention, the data can be described as a series of entities that may the subject of a test. The entities are characterized by a series of attributes related to the entity. Preferred embodiments of the invention may be utilized as an investigation tool. In an investigation embodiment, the entity data may include a series of individuals such as property owners. Attributes for an individual may, by way of example, include inherent data for the person such as height, weight, age, address, etc. The data set of the present invention includes input data which is the data present in the system or process prior to a search and captured data, which includes the data acquired from a search and either added to the data set or utilized to otherwise alter the data set.

The present invention determines through an investigation the likelihood of an attribute, activity, or action ("conclusion") applying to the entity based on an analysis of the results of a search or several searches. The conclusion need not be accurate or objectively true, conclusion for the purposes of the present invention is simply an answer as drawn by the present invention based on its analysis. A preferred embodiment of the analysis system 100 includes an initial data set 102, a search initializer 104, a non-party Internet search engine 106, a bot 108, and an updated data set 110. By a non-party Internet search engine, it is meant a search entity that is not affiliated with either the party performing the analysis or the party holding the data that may be represented in search results presented by the nonparty search engine.

The database of the present invention is expressed in an initial data set 102. The initial data set 102 includes tabulated attributes 130 of any nature. While the present invention utilizes PostgreSQL for its data store, other SQL or non-SQL data storage and management systems could also be used. The data sets 102 can be seen to include 2 dimensions of information. The entities (e.g., persons) are dispersed in the y-axis (represented in FIG. 1 by letters: a, b, y), and information data related to the same entity (e.g., characteristics), are dispersed in the x-axis (represented in FIG. 1 by numbers: 1, 2, X). There is no limit to either the quantity of entities or attributes that may occupy the data sets of the present invention. Lastly, though the information is represented in two dimensions here for the purposes of explanation, this is not a limitation of the present invention.

Figure 3:
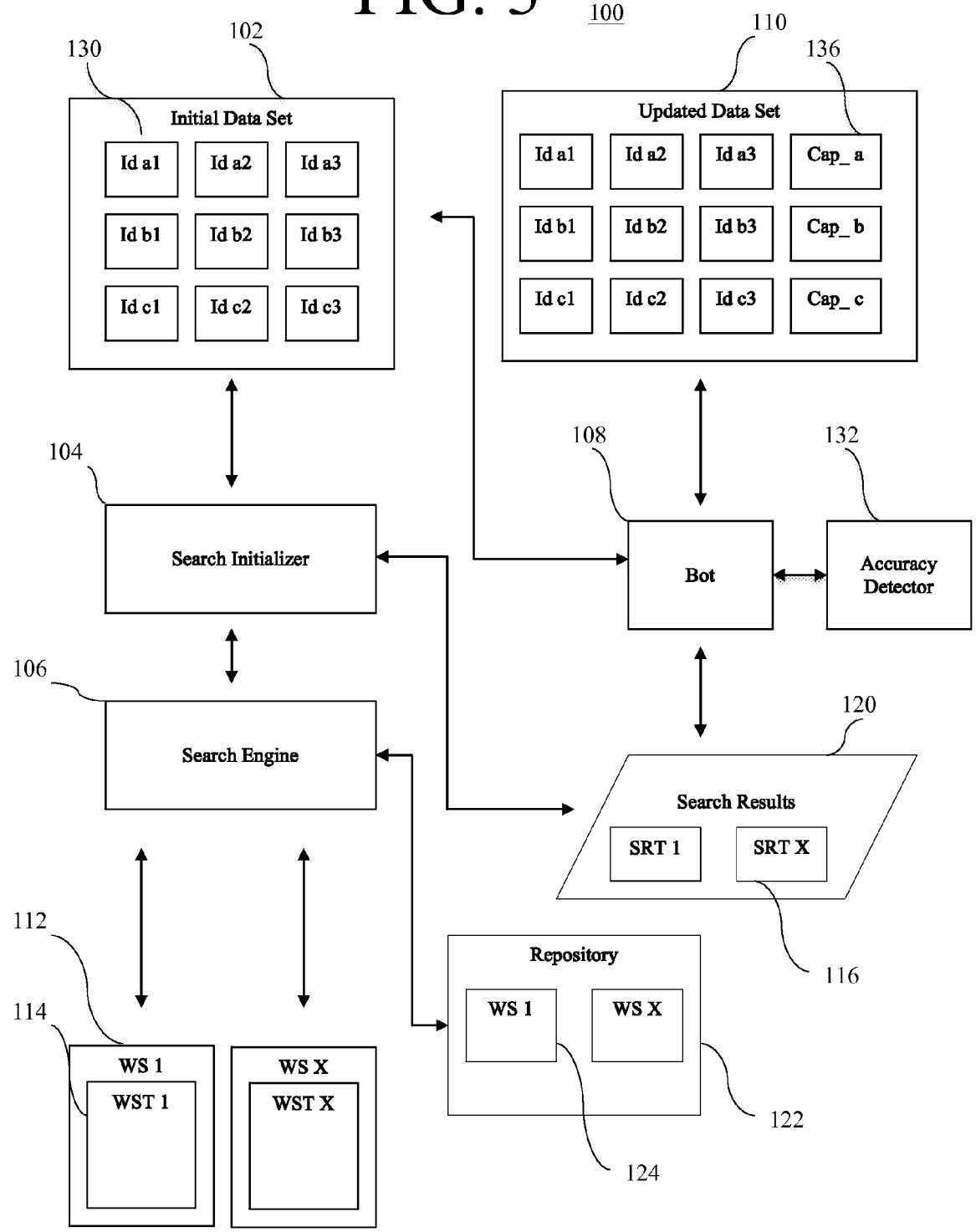
FIG. 3 is a view of the system of the present invention.

Turning to FIG. 3, the preferred initial data set 102 of the present invention is depicted. The initial data set 102 includes as entity attributes 130 identifying characteristics. Preferred investigation data of the present invention includes property owner data, the identifying characteristics of which data constitute the attributes 130. The property owner data is expressed as entities along the y-axis as different property owners while the attributes expressed along the x-axis include the identifying characteristics of the different property owners. Preferred identifying attributes include a name, a telephone number, email address, and any other characteristic that can be related to a particular property owner.

Attributes may be populated or void. Populated attributes have a pre-existing value, irrespective of accuracy. Void attributes lack a value. An example of a void attribute for property owner data may include a null value as a telephone number. If the present invention determines a telephone number for the investigation data, here property owner data, then the present invention may assign a value to the telephone number attribute (in the case of a void attribute), or update the value to the most recent one found (in the case of a populated attribute). The present invention implements this functionality by utilizing normalized tables within its data store, with telephone numbers being stored in a separate table, and joined or associated with addresses and people via a join table. The void attribute data may be later filled with a value—or not—depending on the uses of the present invention.

The search initializer 104 of the present invention is an access vehicle for communicating with and providing instructions to a non-party Internet search engine. The instructions provided to the non-party Internet search engine may be in the form of keyword data to provide to the search engine. In a preferred tax compliance system depicted in FIG. 3, the system 100 includes an embodiment of the search initializer 104 with transaction or conclusion keyword data and attributes, or words and phrases related thereto, for the entity under investigation. Conclusion keyword, also known as transaction keyword, data includes keywords related to the transaction with taxation consequences. The transaction keyword data can include primary and secondary transaction keywords. A primary transaction keyword is a keyword set that directly relates to the transaction/conclusion of consequence; for example, in a real estate transaction/conclusion, the transaction keywords may include a name, a telephone number, an e-mail address, a physical address (e.g., city, state, country, etc.), a price, target consumer characteristics, realty characteristics (e.g., rooms, amenities, location, relative location, etc.), and any characteristics of a real estate transaction. Secondary keyword includes keywords that are topically once or further removed from words and phrases that directly describe a transaction. Examples of secondary keywords in a real estate transaction include synonyms and lesser-used equivalents of primary keywords, transaction histories for a particular vendor, and the like. The search initializer 104 reaches out to access the Internet search engine 106.

The search initializer of the present invention has been designed in such a way that adapters are created for each search engine that is to be used (e.g., Bing, Yahoo, Google). This allows common initialization functionality to be shared across adapters, and specific non-party Internet search engine integration is handled within the associated adapter. Each non-party Internet search engine adapter may vary to handle things like differing search syntax and application programming interfaces (APIs). For example, Bing assumes that searches with more than 5 keywords can be "relaxed" for (i.e., not necessarily require the presence of) the sixth and subsequent keywords. For the search initializer, the presence of every word within the search is desired; therefore the adapter for the Bing search engine adds the search engine specific syntax of "norelax:" when using a long list of keywords.

The non-party Internet search engine 106 of the present invention is designed to aggregate and index information accessible on the World Wide Web, FTP servers, and other information collections accessible to computers. All information that is subject to indexing on an Internet search engine is known herein as search engine indexable Internet resources. The information such as it is possessed by the Internet search engine is known herein as search engine content. The information such as it exists from an original, non search engine source, is known herein as a native search engine indexable Internet resource, e.g. native web sites. The most common form of a search engine indexable Internet resource is a web site. The output of the search is generally presented in a listing of search results 120 of search result entries 116, via which the user may continue on to native or engine-hosted cached versions of the associated resources.

An Internet search engine is a preferred mechanism for accomplishing the objectives of the present invention as it obviates the necessity of the searching party to discover, a priori, the locations of the desired resources, invent an original search algorithm, purchase substantial processing equipment, and duplicate storage and processing efforts. Search engines are easily and reliably accessible, supported by sizable computer processing power, and provided to the Internet community specifically for the purpose at issue, i.e., provide search results in response to specific queries taken from a large and growing cross-section of the Internet. The use of the Internet search engine also avoids a number of problems that may arise when accessing native web sites and resources, including excessive loads placed on web site servers and bandwidth. It is an aspect of the present invention that the assistance of an Internet search engine is relied upon, not only to provide substantial processing power, but also to provide general sorting algorithms. Because search engines are specialized for fast searching that results in useful sorting, the present invention incorporates the methodology reflected in the results provided by any of a number of established Internet search engine providers. A drawback is that the algorithms used by a particular search engine may not be publicly ascertainable, but notwithstanding that secrecy, search engines can generally be relied upon to furnish search results in a fashion that is broadly applicable to various search functions. The search engines are taken "as is" and their return of data in a particular order is adopted by the present invention, as is their discretion in returning multiple or no results for a particular search. The present invention can incorporate any combination of search engines to support its analysis and counteract any problems with any specific engine's particular algorithms.

The search initializer 104 acts to initiate a search that yields a set of search results 120 with search result entries 116 from the nonparty search engine. The bot 108 of the present invention, rather than continuing on to access the native website 112 from the search result entries 116, as is general practice, analyzes only the search results 120 provided by the search engine 106 in response to the search request by the search initializer 104 and wholly bypasses and ignores the native web sites 112. As many web sites expressly invite search engines to harvest web site content for purposes of search engine optimization and the like, the applicability of the present invention is very broad.

Returning to FIG. 1, the bot 108 is loaded with evaluation criteria. The evaluation criteria preferably include keywords, phrases, and other measurement criteria in addition to attribute data, but related to the activity being analyzed/investigated. The keywords of the evaluation criteria and those utilized by the search initializer differ in that the keywords of the search initializer are adapted to generate search results (and are usually of lesser quantity), while the keywords, et al., of the evaluation criteria include a significantly broader range of keywords and evaluation data. In a database augmentation embodiment of the present invention (described above with the present invention utilizing PostgreSQL), the bot 108 uses information from the search results 120 to supply missing or desired data to the initial data set resulting in an updated data set 110. In any embodiment of the present invention, the updated data set 110 can either be a modified version of the initial data set 102, resulting in only a single data set, or can be a distinct data set different from the initial data set 102, resulting in two or more data sets. In the database augmentation embodiment of the present invention, the bot 108 proceeds through as many of the entities as is desired and supplies information for the updated data set transforming void attributes to populated attributes as desired. In the present invention the transformation of attribute data is achieved by either updating an existing database record with the new data, or creating a new record that is then associated with previously existing data via foreign keys within a join table. The information retrieved by the bot is unrestricted in its nature. The keywords of the bot should be chosen to assist the bot in accurately interpreting the search result text 116 to retrieve accurate information for the void attribute data or other function performed by the bot according to the present invention.

The bot 108 may parse the search result entry data 134 of the search results 120 pursuant to any means known in the art. A first preferred means of ensuring accurate parsing of search results as evaluation criteria involves the uses of structured data. Structured data is recognizable among unrelated data, as structured data possesses an identity distinct from the information that it represents. That is to say, a telephone number can be recognized as a telephone number on the basis of its numbers (its information), its depiction as the number of digits that the telephone number possesses (nine for standard telephone numbers), or its format, such as a particular hyphenation or spacing pattern associated with telephone numbers (e.g., ###-###-####, (###)###.####). Structured data may take many forms, including the means of portraying a name, address, location, email address, a URL, etc.

The bot 108 may parse information present in search results 120, particularly search result entry data 134, according to loaded evaluation criteria, provided as initial or updated instructions as to the relevance of the information subject to being passed to the updated data set 110. Search result entry data includes the information, such text, media, graphics, files, etc. that may be available directly from the search engine results without further recourse to the search engine indexable Internet resource. It is preferred that the evaluation criteria be manually loaded such that the criteria is supervised by human handlers. For example, the bot may be instructed to compare URL results with a URL database; the result originating from a particular URL in that database may be an indication of validity or invalidity. In practice, the bot 108 may be allowed to proceed with the parsing of the search results and paused after a significant period of activity, that is say, the bot need not parse every search result entry for the search entry data therein. The results of the updated data set may be reviewed manually for the relevance and accuracy of the information passed from the bot thereto, i.e., information that has been used to transformed void attributes to populated attributes, and the results of such review can be used to update the instructions used by the bot used as evaluation criteria in subsequent operations. Valid captured data, i.e., data that matches the requirements of the data being sought, can be aggregated to ascertain similar characteristics of the valid data. An example of frequently valid similar characteristics includes a common URL source, particularly the tax compliance embodiment of the present invention. Information can be determined as having greater validity if it originates from a URL source supporting and encouraging such transactions with taxation consequences, e.g., craigslist.org, for rental offers.

The factors utilized as evaluation criteria are without limit and may be any factor related to an activity that is the subject of the analysis. Exemplary evaluation criteria include: whether there are search results at all; whether the search results contains attributes, or related information, or keywords at all; a determination of the information content in the search results; the number of search result entries returned; the frequency of the attributes, or related information, or keywords in the search results; a determination of the information of the meta tags; the domains from which the results originate; a determination of the information extracted from the domain which the results originate; etc. Each of the above criteria is considered search result data.

A whitelist of URLs can be aggregated as evaluation criteria in the bot. Information originating from a whitelist URL can be immediately, or graded as more likely to be, passed to the updated data set. Conversely a blacklist of URLs can be aggregated as evaluation criteria in the bot to grade web sites as less likely to be passed to the updated data set. As an example for the taxation compliance embodiment, a whitelist might include a craiglist.org for rental offers while the blacklist might include informational do-it-yourself web sites related to construction projects, or reverse phone number web sites. Information from the bot's parsing deemed initially to have potential to be passed to the updated data set might be negated and the present invention may re-parse the search results for a second or other candidate, move to the next distinct entity of the initial data set without attempting to provide information to void attributes, or perform another operation of the present invention. Rather than analyze the content of the search results, the bot may be loaded solely with URL comparison data, such that the existence of any search result entry corresponding to a whitelist URL equates to the validity of the activity subject to analysis. Another operation of the present invention includes the filtration embodiment of the present invention depicted in FIG. 2.

Figure 2:
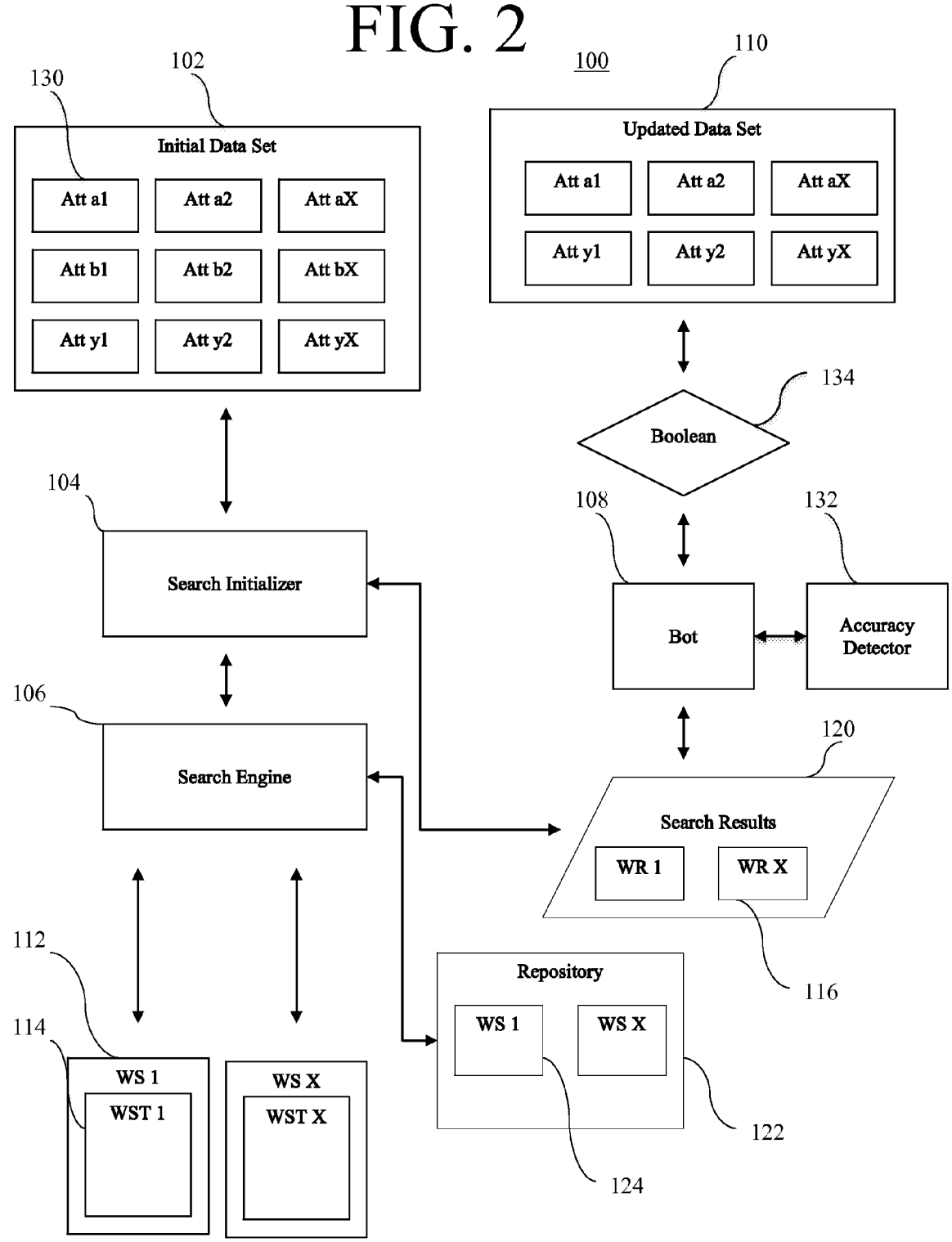
FIG. 2 is a view of the system of the present invention.

Turning to FIG. 2, the filtration embodiment of the system 100 of the present invention includes a Boolean filter 134. A primary difference between the filtration embodiment and the augmentation embodiment is that the filtration embodiment acts to reduce the initial data set 102 to an updated data set 110 that includes a diminished quantity of entities relative to the initial data set entities. The filtration embodiment may be used in operations when a user desires not to expand a database of known information constituents, but rather to determine whether entities have or have not engaged in a particular activity. The initial data set 102 passes entities with their related attributes to the search initializer 104, which accesses and sends instructions to a search engine 106, which uses its repository 122 of stored websites and its particular search algorithms to produce search results 120. The bot 108 parses the search results 120 and a Boolean filter 134 that includes instructions therein, or communicates with another component of the present invention bearing instructions, to determine whether the entity has been confirmed as engaging in an activity on the Internet. If the entity is confirmed as engaging in an activity the Boolean filter returns a value as "true" and either retains or deletes the entity in the updated data set 110 or provides an updated data set that includes some indicia of the entities categorized as either "true" or "false." If the entity is not confirmed as engaging in an activity the Boolean filter returns a value as "false" and either retains or deletes the investigation data in the updated data set 110.

An example of a preferred use of the filtration embodiment of the present invention is to search for entities that engage in an activity. As an example, the entity data may be composed of property owners within a community. Property owners that engage the activity in question, are parsed via the bot 108, and then rather than augment the entity data from the initial data set 102 the Boolean filter 134 deletes "false" entity data to create an updated data set 110 consisting solely of "true" entity data. If the activity includes offering the property for rent, then the updated data set 110 includes only those property owners as entities suspected by the present invention as engaging in offering the property for rent. Alternatively, the filtration embodiment of the present invention can be functionally replicated by the augmentation embodiment by utilizing a Boolean as an entity attribute in the initial data set 102 that is modified by the bot 108.

Figure 4:
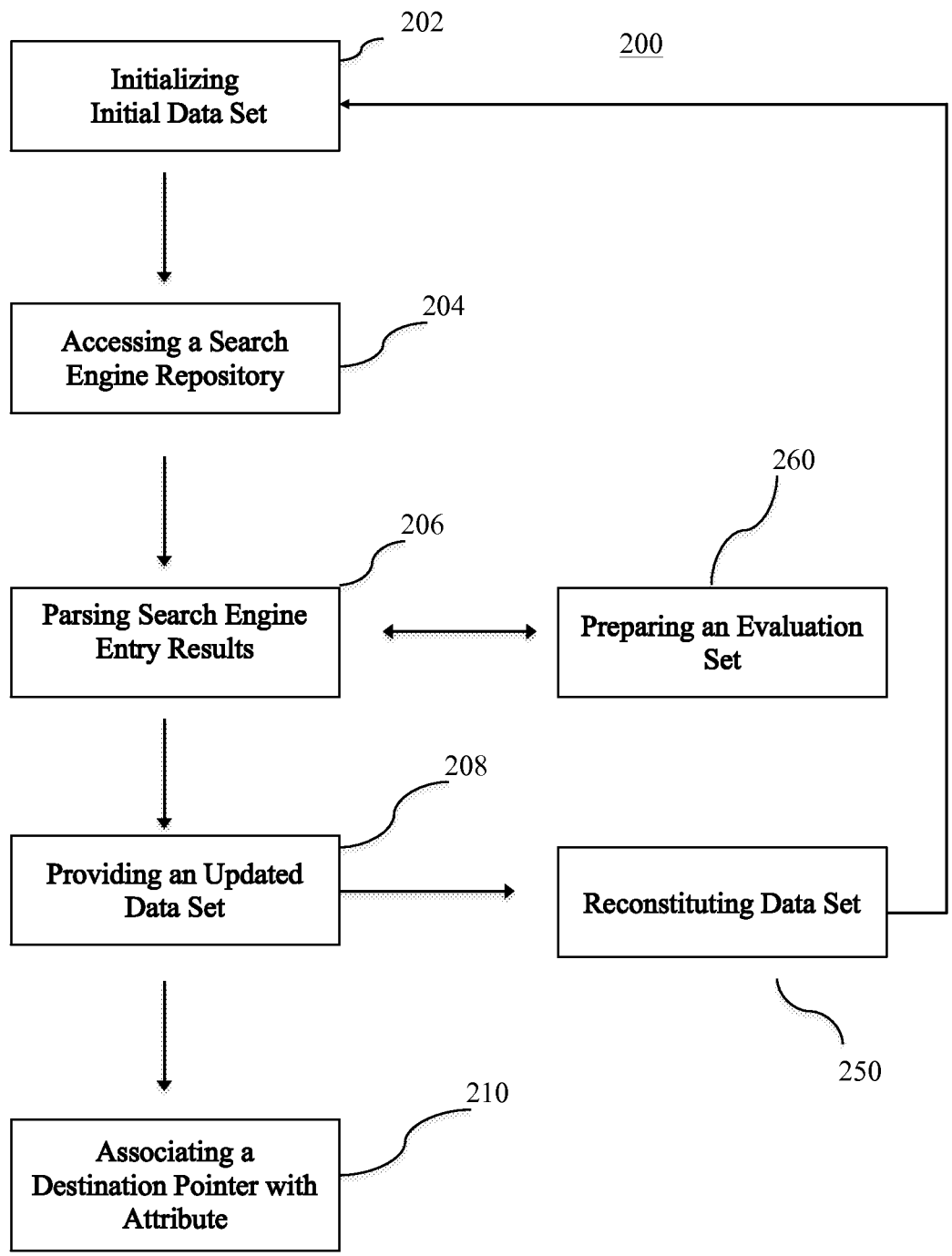
FIG. 4 is a view of the process of the present invention.

Turning now to FIG. 3, the present invention may also generate an updated data set 110 that includes captured data 136. An aspect of the present invention includes the scouring of the Internet to acquire captured data based on the input data. The captured data may include new attributes of pre-existing entities of pre-existing categories (in a fashion similar to that of updating void data attributes to populated attributes), new entities that may include one or more attributes corresponding to attributes pre-existing or otherwise, new attributes of existing entities in categories pre-existing or other, and the like. It is preferred that captured data correspond to the existing structure of the initial data set; that is to say, the entry of a new entity or apply to a pre-existing entity attribute category even if occupied by void placeholders. However, the present invention may act as a scouring agent that acquires data related to the activity that is the subject of the analysis and add such data as information as an attribute for an entity irrespective of applicability to a category. Exemplary captured data may include narratives about/from the entity, media about/from the entity, data files, etc. Captured data acquired by the bot 108, or a link to external data file as a proxy for the captured data, may be positioned in the updated data set 110. Another preferred form of captured data 136 includes a link to the Internet source serving as the basis for modifying or updating the data in the updated data. As the present invention does not visit a native, contemporaneous web site, it is preferred, as in shown in FIG. 4, the means by which a reviewing party may audit the results of the data set manipulation is to associate 210 a link with the entity data, to permit a third-party reviewer a means to access the native web site, or cached version thereof, containing the data upon which the conclusion was drawn. Furthermore, any data as existing in the updated data set as different from the data in the initial data set, whether such differences derive from transition of void attributes to populated attributes, the acquisition of captured data, the addition of entities, etc., may be reconstituted 250. By reconstituted, it is meant that the data of the updated data set is arranged as initial data for one or more further passes through other steps or components of the present invention. By re-cycling modified data through the steps and components of the invention, the accuracy of the invention is enhanced because outdated, inaccurate data is discarded for new, accurate data and pre-existing data may be supplemented with additional data.

Returning to FIG. 3, an example of the present invention utilizing captured data is a job-posting embodiment of the present invention. The investigation data may include employment opportunities with the hiring business as the entity and the business name, business address, and business telephone number as entity attributes data and the position and salary as void attributes. The search initializer 104 may access a non-party search engine 106 to generate search results 120 from which a bot 108 parses search result entry data 134. Upon determining the salary and position of specific business entities, the bot may further capture the narrative related to the position or the narrative characterizing the rationale related to a salary range. One means for determining the existence of, for example, the narrative as captured data is to supply the bot 108 with keywords relating to a position description as a first evaluation criterion and then grammar syntax cues relating to the beginning and end of a suspect narrative (e.g., paragraph indentations, seek root word "requirement" in first sentence, seek bullet marks, etc.) as the second evaluation criterion.

In a Request-for-Proposal embodiment, the present invention may capture the request for proposal document as a standalone file as captured data. The investigation data may include agency projects with the agency project as the entity data and the agency name, agency address, and agency telephone number as entity attributes and the project name as void related data. Upon determining the project name, the bot may further capture the RFP document for persistent retention. To ensure that the file capture does not involve accessing the native website, the bot may be loaded with instructions to acquire such files merely from the non-party search engine, or upon finding that the non-party search engine lacks a required file, captures link data describing the location of the file.

Alternatively the captured data, particularly when files, may be captured directly from the native website.

The captured data may further be used in the evaluation criteria of the bot. The bot may be manually loaded with keywords and information related to positive correlations, i.e., whitelist, or negative correlations, i.e., blacklist. Positive correlations with keywords include keywords that make the existence of a fact more likely than not, and the negative correlations with keywords include keywords that make the existence of a fact less likely than otherwise. Use of keyword captured data with the evaluation criteria is particularly useful when transaction keywords in the search initializer are likely to generate search results that include unrelated search result text snippets and unrelated historic web site data. For example, in the RFP embodiment of the present invention, the evaluation criteria may include as whitelist components verbs related to the provision of a request for proposal, such as the keywords: "contractor," "bid," keywords related to credentials, and the like. The evaluation criteria may include as blacklist components verbs unrelated to the provision of a request for proposal but related to government agencies. For example, if requests for proposals frequently share general terms with the frequently asked questions pages of government agencies, then appropriate blacklist components may include such keywords as: "FOIA," "Privacy Act," "Request Records," and the like.

The confidence, or accuracy, detector 132 of the present invention provides an attempt to measure the confidence of the intended updates that would form the updated data set 110 if applied. The confidence detector differs from the evaluation criteria in that the evaluation criteria attempts to qualitatively review a data candidate purely for the purposes of inclusion or exclusion. A preferred version of the confidence detector includes a pre-defined scoring system attributing a specified score to the findings of a search in an attempt to quantitatively measure the results of the search. Another general methodology for scoring the results of bot output or findings includes the comparison of the bot outputs for different search engines accessed during the searching step of the present invention. The process of the present invention may run in a parallel series, such that a first use of the process searches GOOGLE, a second use of the process searches BING, a third use of the process searches YAHOO, etc. Information may be found in the differences between the outputs of the bots for each different search engine. Generally, scores may be positive or negative to produce a positive or negative score total, or any other basis for scoring or grading confidence may be utilized.

Figure 6:
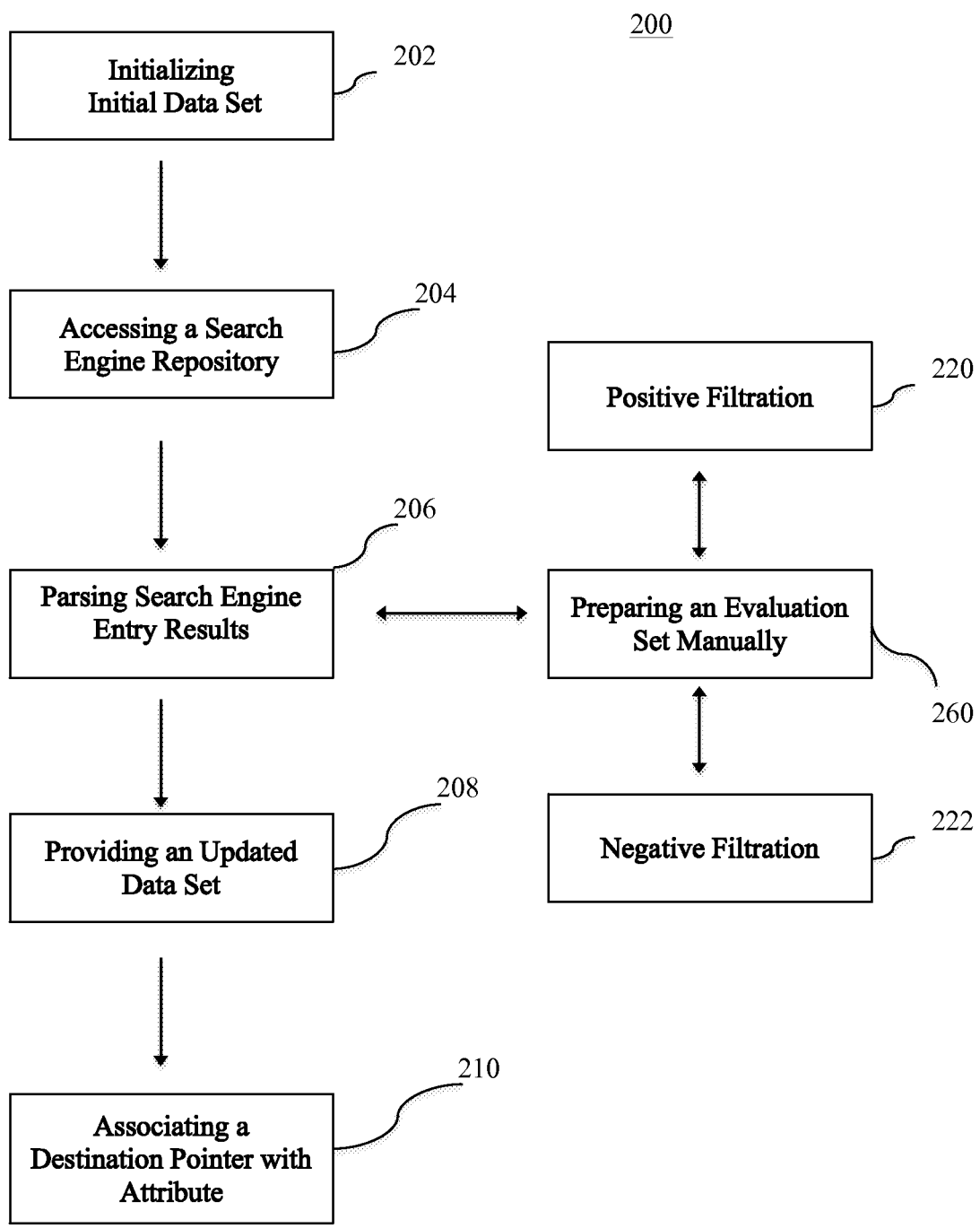
FIG. 6 is a view of the process of the present invention.

Turning to FIG. 6 in view of FIG. 1, a simplistic, fictional example of a present invention is presented in which there is an investigation in an attempt to determine literary characters that have visited Wonderland. The initial data set 102 is initialized 202 to include, as entities, literary characters: the attributes may include the character name, character physical characteristics, and character location as populated attributes, and a Boolean value representing whether it is true that the character visited Wonderland as a void attribute. The search initializer 104 is loaded with the populated attributes of the entity and transaction keyword data and accesses 204 a search engine repository 122. The initial data set 102 may include such entities and attributes as represented in Table 1.

TABLE 1

| Examples of Entities and Attributes in Initial Data Set | | | |
|---|---|---|---|
| Alice | girl who wears a pinafore | Britain | Var_Visit Wonderland? |

TABLE 1-continued

| Examples of Entities and Attributes in Initial Data Set | | | |
|---|---|---|---|
| Deerslayer | man in leather chaps | Forests of North U.S. | Var_Visit Wonderland? |
| Babe | blue ox | U.S. | Var_Visit Wonderland? |

The search initializer might include such search strings as Att_1+Att_2+Att_3+"Wonderland"+(("fell" or "fall")+"well")+"mirror." The Att_X search terms include reproductions of the populated attributes and the remaining terms include transaction keywords relating to investigation of the activity of visiting Wonderland, which for the sake of the present disclosure is only accessible through wells and mirrors. A search term as passed to the search initializer may include, in the case of the first distinct entity of the investigation data: "Alice"+"girl who wears a pinafore"+"Britain"+"Wonderland"+(("fell" or "fall")+"well")+"mirror."

In the embodiment of FIG. 6 with reference to FIG. 2, the search initializer 104 accesses 204 the search engine to retrieve the search results 120. An example of a web site data 114 referred to by search result entry 116 may resemble that of FIG. 7. The present invention acts to approximate the results of a thorough analysis of native web page content, such as the web site data 114 of FIG. 7, without ever accessing native web pages 112 or the native web page data 114 with the efficiency of relying solely on an Internet search engine. The search engine repository 122 may include an identical cached version of the native web page 112 as content 124, a previous version, a similar version, or not include a version of the native web page at all. Another aspect of the present invention is the ability to analyze data from the Internet, as it existed historically; when such an objective is sought, it may be advantageous to include a time stamp as a captured data attribute in the updated data set.

In continuing the 'Wonderland Example', and as shown by FIGS. 1, 6 and 8, the search initializer 104 may access 204 the search engine repository 122 to receive, as a search result 120 for Alice as an entity in the initial data set 102, the search results 120, search result entries 116, and search result data data 134 of FIG. 8. As can be seen by FIG. 8, rather than reproduce directly or indirectly web site text, the present invention parses and analyzes 206 only the search results 120, specifically and preferably the search result entry data 134, and the search result entries 116 as truncated, ordered, and otherwise edited, by the search engine 106 by using the bot 108 to test the investigation data. If the bot 108 is prepared 260 with evaluation criteria that includes such transaction keyword search terms related to visits, prominent Wonderland citizens (e.g., the Rabbit), etc., then the bot 108 can determine as an output conclusion that Alice is valid data and provide 208 an update to the updated data set 110 accordingly. The bot 108 in reviewing the search results 120 may evaluate each search entry individually, in groups, or in their totality to test the investigation data, entity by entity. Furthermore, the bot 108 may return an action related to investigation data as valid merely by the existence of any, or a particular quantity of, search results for the search initiated by the search initializer.

In continuing the 'Wonderland Example', and as shown by FIGS. 1, 6 and 8, the search initializer 104 may access 204 the search engine repository 122 to receive, as a search result 120 for Alice as an entity in the initial data set 102, the search results 120, search entities 116, and search entity data 134 of FIG. 8. As can be seen by FIG. 8, rather than reproduce directly or indirectly web site text, the present invention parses and analyzes 206 only the search results 120, specifically and preferably the search result data 134, and the search results entries 116 as truncated, ordered, and otherwise edited, by the search engine 106 by using the bot 108 to test the investigation data. If the bot 108 is prepared 260 with evaluation criteria that includes such transaction keyword search terms related to visits, prominent Wonderland citizens (e.g., the Rabbit), etc., then the bot 108 can determine as an output conclusion that Alice is valid data and provide 208 an update to the updated data set 110 accordingly. The bot 108 in reviewing the search results 120 may evaluate each search entry individually, in groups, or in their totality to test the investigation data, entity by entity. Furthermore, the bot 108 may return an action related to investigation data as valid merely by the existence of any, or a particular quantity of, search results for the search initiated by the search initializer.

To further safeguard accuracy, as can be seen in FIGS. 1 and 6, the present invention may utilize enhanced evaluation criteria and a confidence detector 132. Enhanced evaluation criteria may include positive filtration 220 and negative filtration 222, utilizing the positive filters (i.e., whitelists) and negative filters (i.e., blacklists), respectively, discussed herein. The confidence detector 132 constitutes an attempt to mathematically score data manipulated within the updated data set 110 or the differences between the initial data set 102 and the updated data set 110. Scores may be provided for particular positive words, phrases, locations, and the like, and scores may be provided for particular negative words, phrases, locations, and the like. The output of the confidence detector for each distinct entity may be inserted into the updated data set 110 or otherwise associated with the distinct entity.

Figure 9:
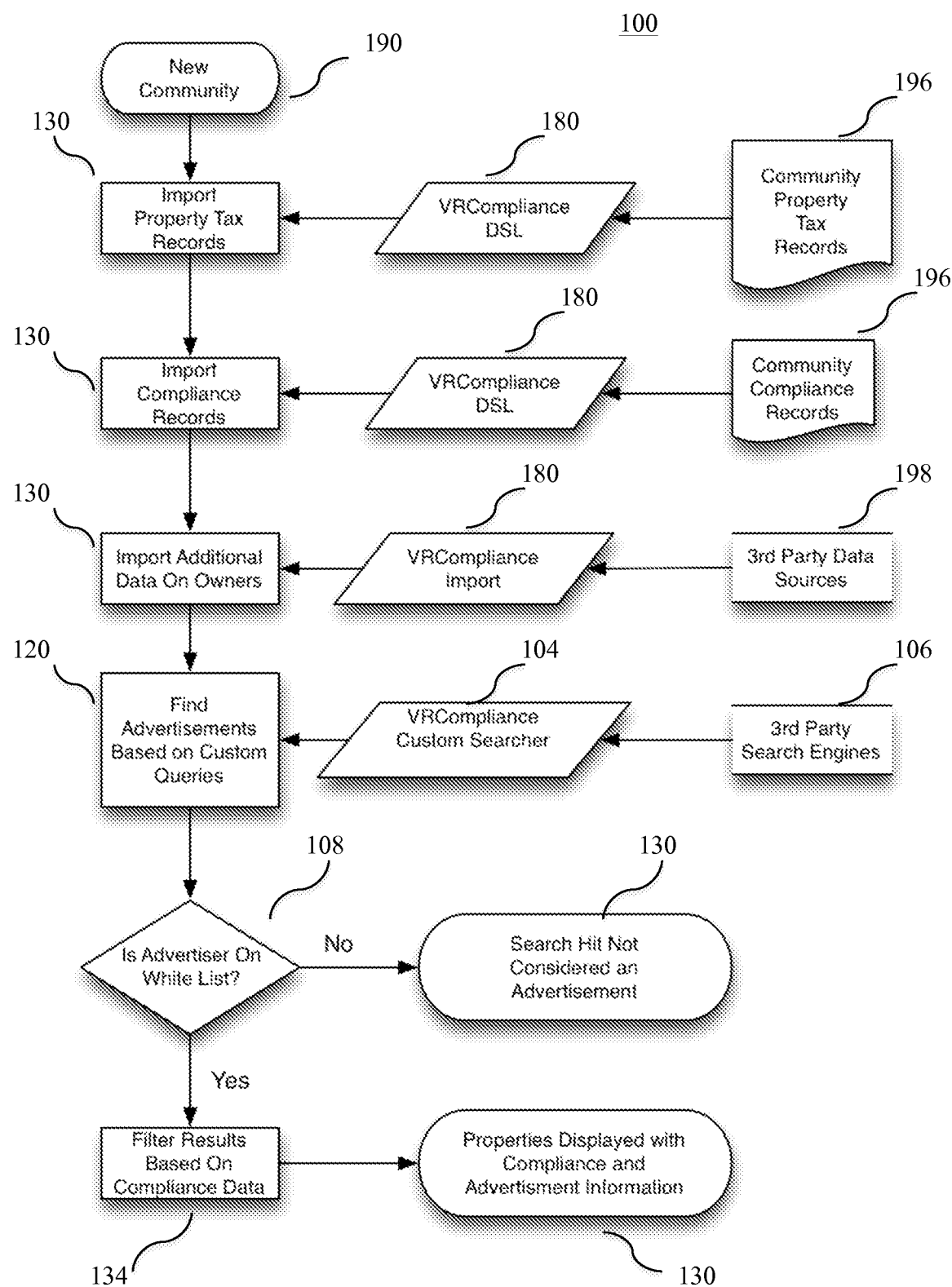
FIG. 9 is a view of the system of the present invention.
Figure 10:
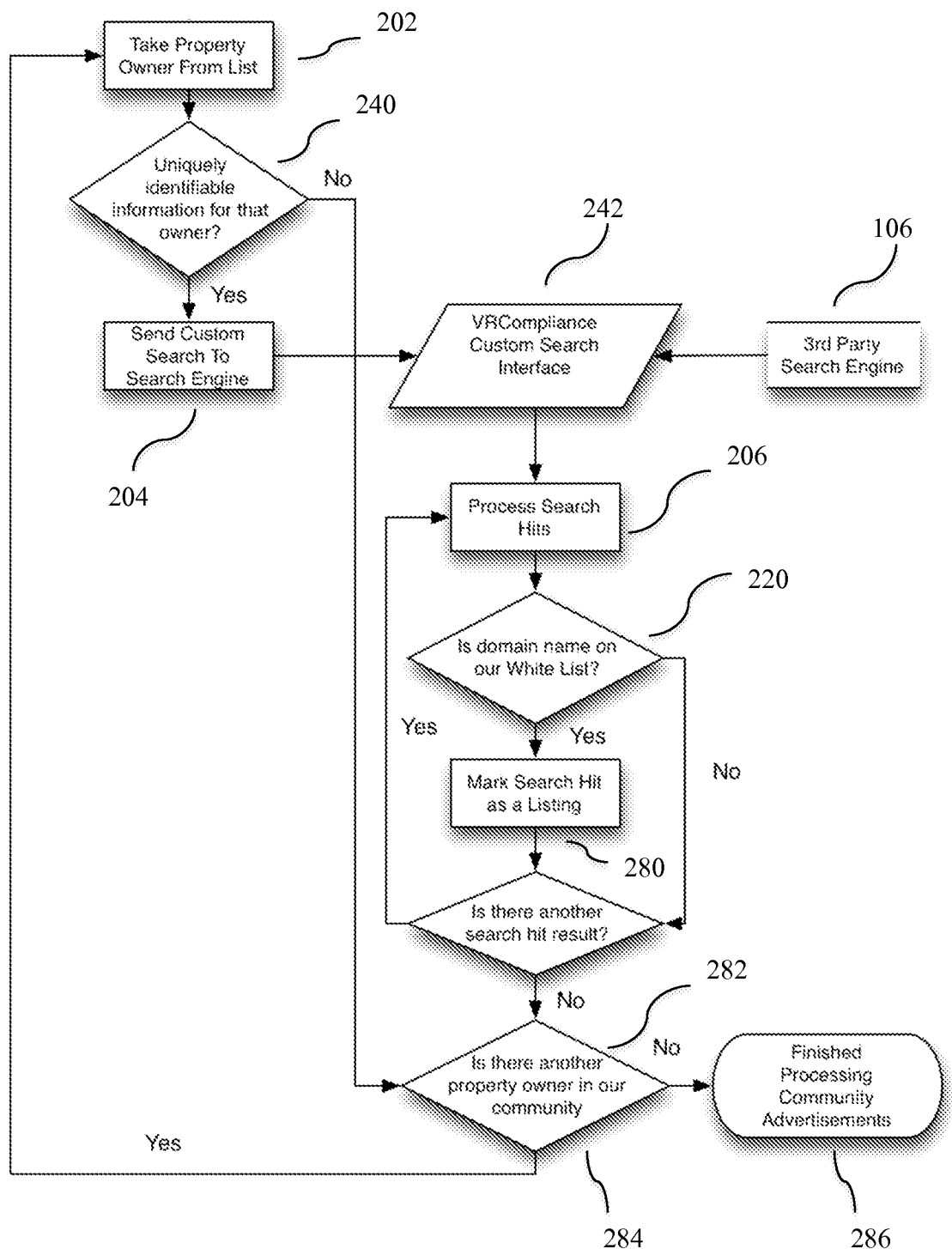
FIG. 10 is a view of the process of the present invention.

Turning now to FIGS. 9 and 10, a preferred embodiment of the tax compliance, i.e., VRCompliance, system 100 and process 200 and of the present invention is used to monitor tax compliance by vacation rentals by property owners. An increasing number of second-home owners are renting their homes as vacation properties. Using online advertising means, many of these property owners are able to market their properties and handle bookings at a minimal cost without using a property management firm. In many such cases the owners are unaware that renting a property often requires compliance with state and community specific sales/lodging tax and business licensing requirements. There is a potentially large and increasing amount of community revenue that is lost due to the non-compliance of the Vacation Rental By Owner (VRBO) property owners. Additionally, there are significant market distortions that arise from varying degrees of compliance within a particular market.

The growth of the VRBO market will continue to drive the compliance problems experienced by resort communities and revenue and tax departments. Currently, determining compliance can be a labor-intensive process because there are a number of websites where individuals advertise their properties, and a number of additional disparate and non-correlated data sources that in the aggregate comprise the complete data set required to assess compliance. The properties are generally only listed with a phone number or an email address for contacting the owner. There is a lack of critical information such as the full name of the owner and the address of the vacation home, including unit number. Currently a community 190 is left with the decision of whether to make direct contact by calling the owner or search for the owner's property address via indirect means. Some communities 190 search for the properties based on photos posted on the website. Regardless of how communities try to identify these properties and their owners, the process continues as listings are updated, added, and deleted daily from online sites.

The VRCompliance methodology simplifies the process of matching vacation rental property advertisements to property owners, and verifying whether the property owners are in compliance with tax and licensing requirements for the community. The methodology is as follows: (a) Import Property Tax Records For A Community; (b) Import Compliance Records For A Community; (c) Import Additional Data On Owners From External Data Sources; (d) Create Queries Using Gathered Information That Should Result In Advertisements; (e) Process Queries Using Search Engines; (f) Filter Query Results To Show Information That Is More Likely To Be An Advertisement (g) Provide The User The Results In A Digestible Format.

Property tax records 196 for the community 190 are obtained for the community and imported into the VRCompliance system as populated constituent data 130. Because each community 190 has their tax records in a different format a normalization filter 180 is required. A preferred normalization filter 180 utilizes a Domain Specific Language (DSL) may be employed to aid in importing records from various formats into the common format that is used by the VRCompliance system. A DSL is a programming language with syntax dedicated to a particular problem domain, a particular problem representation technique, and/or a particular solution technique. The preferred DSL for property importing includes the following language constructs:

community_name(name)—The community name can be specified. If it already exists in the VRCompliance system, then that community object is used; otherwise a new community object is created and saved within the VRCompliance system.

map(vr_column_name, input_column_name, options={ }, &block)—The map construct allows one to declare a mapping between an input column from the community data, and our output column or column names. The map construct can apply output filters to run prior to assigning data to the result, or it can take a block for more complicated processing. See the following examples:

EXAMPLE 1

The following is a simple example that maps the value in column 39 of the input file to the VR_ADDRESS2 column in the output map "VR_ADDRESS2", 39

EXAMPLE 2

The following example shows that column 3 is should be run through a normalizing and capitalization routine prior to being assigned to the output column VR_MAILING_ADDRESS_CARE_OF.

map "VR_MAILING_ADDRESS_CARE_OF", 3, :methods=>[:normalize upcase]

EXAMPLE 3

The following example is a more complicated manipulation of multiple columns of incoming data that is then assigned to a single row in the output. In this case the VRCompliance address 1 is comprised of columns 34 through 38 of the incoming data. The address is normalized and made to be uppercase. In this case the incoming data sometimes has a value of "NO ASSIGNED ADDRESS". However, the internal representation for that is "N/A".

```
map "VR_ADDRESS1", :na do |row|
    address_num = ""
    begin
        address_num = Float(row[34]).to_i.to_s
    rescue Exception => e
        address_num = row[34]
    end
    address = [address_num, row[35], row[36], row[37],
row[38]].compact.join(" ")
    address = address.normalize_upcase.gsub(/^0+/,'') unless address.nil?
    if address == "NO ASSIGNED ADDRESS"
        address = "N/A"
    end
    address
end
```

Three additional constructs of the DSL allow assigning of regular expressions that can be used to determine if the listed owner is a business, a trust, or a person or persons.

business_words(regular expression)
trust_words(regular expression)
person_words(regular expression)

Additionally there is a construct for parsing owner names.

owner_parser(&block)—The owner parser accepts a block of custom code that is used to parse the normalized owner data. The resulting data will be one or more person objects in a form that is usable by the VRCompliance system.

The final construct is the call that specifies the input file name that should be loaded.

import_properties (file_name, options={ })—The file_name is a file on the file system that should be imported, and the options describe the file such as whether the file has a header row.

By setting up a configuration block using this internal language process community tax records can be more simply formatted in a style convenient to the VRCompliance system.

Importing compliance records 196 of a particular type for a community as populated constituent data 130, in the VRCompliance methodology, may be achieved using the DSL techniques described above. The VRCompliance methodology may be applied to any compliance type, e.g. a business license or a sales and lodging tax filing. Communities provide information on property owners within that community that are compliant in these contexts. Once imported, within the VRCompliance methodology an association is created between the property and its associated compliance records.

The methodology includes importing additional data on owners, such as phone number and email addresses, from external data sources 198 to create additional populated constituent data. Thus this embodiment utilizes information wholly originating from the community 190 and non-Internet sources 198 to populate 202 the initial data set 102 of the present invention.

The methodology then populates the search initializer 104 using constituent data and other information as keywords calculated to yield results that include relevant advertisements. For each property owner (the entity) in a community a custom query is created 204 to search for potential advertisements. These custom queries are tested 240 for uniqueness and then sent to the search engines 106 via a custom VRCompliance interface 242 in the search initializer 104. The VRCompliance system then iterates through the custom search results 120 for each user. The custom searches utilize unique information that is associated with the owner such as their phone number or email. Based on the uniquely identifiable information, the results of these searches are tied to the person and the rental property(ies) owned by that person.

The methodology filters query results to consider information that is more likely to be an advertisement. Simply because a search result is found does not mean that it is an advertisement for a rental property. In order to minimize the amount of noise received in search results the VRCompliance methodology parses 206 the results via a bot 108. Search results are filtered based on whether the domain name that the search result points to is on a whitelist 220 or blacklist 222 that has been analyzed by human analysis or can be ignored. The results are marked 280 and passed to a Boolean filter 134. A return 282 continues the process 200 until the initial data set is exhausted of distinct data. Only search results that are associated with domains on the white list 220 are displayed for a given property in a community and are recognized as such because the updated data set includes as constituent data 130 a Boolean validating/negating the possibility of tax compliance. These search results are considered advertisements and are associated with the property in the community that is owned by the property owner. Upon finishing 286 the process, the updated data set may be viewed.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A computer-implemented Internet analysis system, said system comprising:
   a processor, coupled to a nontransitory computer-readable storage medium memory, for executing the following program constituents:
   an initial data set of input data, in said memory, including a series of entities,
   each of said entities characterized by a series of entity attributes;
   a nonparty Internet search engine, that accepts free-form text entry as search criteria, with a repository of content, stored in a search engine nontransitory computer-readable storage medium, from search engine indexable Internet resources that exist independently of said search engine as native search engine indexable Internet resources;
   a search initializer, loaded with search keyword data derived from said entity attributes, adapted to access said search engine to generate, for at least one of said entities, a search result of search result entries, with search result entry data, queued according to policies of said search engine;
   a bot, loaded with evaluation criteria including at least one key text element, adapted to parse said search result for comparison of said evaluation criteria with text elements of said search result, bypass said native search engine indexable resources corresponding to said search result entries, to informationally evaluate said search result with said evaluation criteria to determine as an output an investigation conclusion concerning at least one of said entities;
   an updated data set-derived from said initial data set as informed by said output of said bot; and
   a filter, adapted to review said output of said bot, manually loaded with at least one positive filtration criterion to automatically affect said output of said bot based on existence of said positive filtration criterion in association with said entity, wherein said search result entries constitute abbreviated synopses of said native search engine indexable resources, said search result entries both selected and abbreviated according to policies of said search engine.

2. The system of claim 1 wherein said search keyword data includes keywords related to said conclusion.

3. The system of claim 1 wherein said initial data set includes attributes corresponding to predetermined, uniform categories.

4. The system of claim 3 wherein said updated data set includes as at least one of said entity attributes said output of said bot.

5. The system of claim 3 wherein said bot captures information from said search result entry data as captured data.

6. The system of claim 5 wherein said updated data set includes captured data.

7. The system of claim 5 wherein said captured data includes a destination pointer comprising a data link identifying a search engine indexable Internet resource from said search result.

8. The system of claim 5 wherein said updated data set includes said captured data as at least one of said entity attributes.

9. The system of claim 8 wherein said updated data set includes captured data as an entity.

10. The system of claim 1 further comprising a confidence detector adapted to evaluate said captured data to provide a confidence rating of said output of said bot.

11. The system of claim 1 further comprising a filter, adapted to review said output of said bot, manually loaded with at least one negative filtration criterion to automatically affect said output of said bot based on existence of said negative filtration criterion in association with said entity.

12. The system of claim 1 wherein said output consists of a Boolean value.

13. The system of claim 12 wherein said updated data set consists of entities coupled with said entity attributes for which such output is true.

14. The system of claim 12 wherein said updated data set consists of entities coupled with said entity attributes for which such output is false.

15. An Internet analysis process implemented by a computer comprising at least one processor, said process comprising:
  initializing an initial data set of input data, on a nontransitory computer-readable storage medium, including a series of entities, each of said entities characterized by a series of entity attributes;
  accessing a nonparty Internet search engine that accepts free-form text entry as search criteria with a repository of content, stored in a search engine nontransitory computer-readable storage medium, from search engine indexable Internet resources that exist independently of said search engine as native search engine indexable Internet resources;
  searching said search engine with search keyword data from said entity attributes to generate, for at least one of said entities, a search result of search result entries, with search result entry data, queued according to policies of said search engine;
  parsing said search result entry data with a bot, loaded with evaluation criteria including at least one key text element, adapted to bypass said native search engine indexable resources corresponding to said search result entries, to informationally evaluate said search result by comparison of said evaluation criteria with text elements of said search result to determine as an output an investigation conclusion concerning at least one of said entities;
  providing an updated data set derived from said initial data set as informed by said output of said bot; and
  filtering said output of said bot with at least one manually loaded criterion selected from a group consisting of a positive filtration criterion, a negative filtration criterion, and combinations thereof, to automatically affect said bot output based on an association between said criterion with said entity,
  wherein said search result entries constitute abbreviated synopses of said native versions of said search engine indexable resources, said search result entries both selected and abbreviated according to policies of said search engine.

16. The process of claim 15 wherein said providing step includes determining as said output a Boolean value.

17. The process of claim 16 wherein said providing step includes providing said updated data set that consists of entities which such output is true.

18. The process of claim 15 wherein said parsing step includes capturing information from said search result entry data as captured data and said providing step includes providing said updated data set with captured data as said entities.

19. The process of claim 15 wherein said parsing step includes capturing information from said search result entry data as captured data and said providing step includes providing said updated data set with captured data as said attributes.

20. A computer-implemented Internet analysis system, said system comprising:
  a processor, coupled to a nontransitory computer-readable storage medium memory, for executing the following program constituents:
  an initial data set of input data, in said memory, including a series of entities,
  each of said entities characterized by a series of entity attributes;
  a nonparty Internet search engine, that accepts free-form text entry as search criteria, with a repository of content, stored in a search engine nontransitory computer-readable storage medium, from search engine indexable Internet resources that exist independently of said search engine as native search engine indexable Internet resources;
  a search initializer, loaded with search keyword data derived from said entity attributes, adapted to access said search engine to generate, for at least one of said entities, a search result of search result entries, with search result entry data, queued according to policies of said search engine;
  a bot, loaded with evaluation criteria including at least one key text element, adapted to parse said search result for comparison of said evaluation criteria with text elements of said search result, bypass said native search engine indexable resources corresponding to said search result entries, to informationally evaluate said search result with said evaluation criteria to determine as an output an investigation conclusion concerning at least one of said entities;
  an updated data set-derived from said initial data set as informed by said output of said bot; and
  a filter, adapted to review said output of said bot, manually loaded with at least one negative filtration criterion to automatically affect said output of said bot based on existence of said negative filtration criterion in association with said entity,
wherein said search result entries constitute abbreviated synopses of said native search engine indexable resources, said search result entries both selected and abbreviated according to policies of said search engine.

\* \* \* \* \*